Nov. 7, 1972    D. W. WALDRON    3,702,306
FOGGING METHOD AND APPARATUS
Original Filed March 17, 1970    4 Sheets-Sheet 1

Nov. 7, 1972  D. W. WALDRON  3,702,306
FOGGING METHOD AND APPARATUS

Original Filed March 17, 1970  4 Sheets-Sheet 2

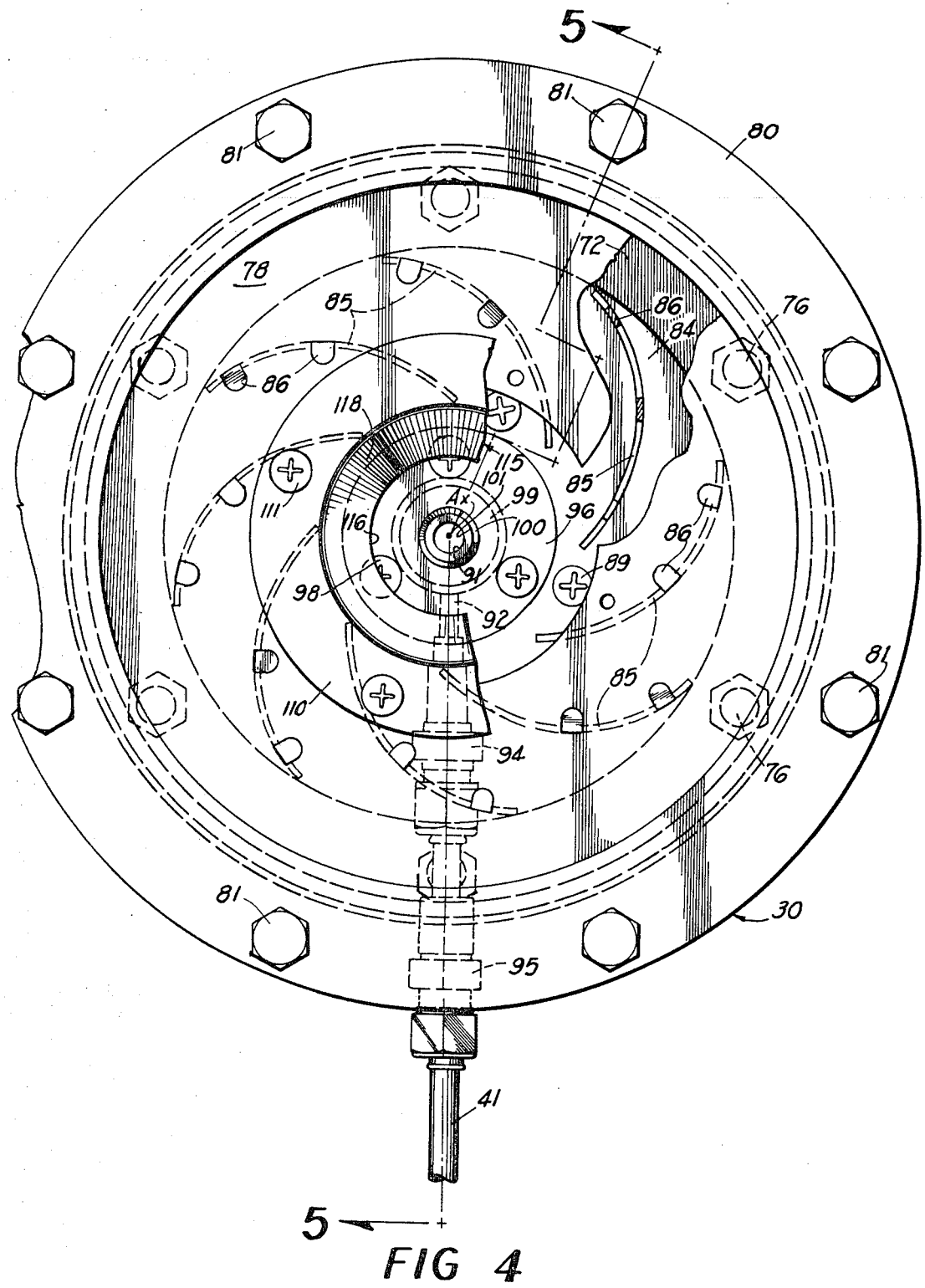

United States Patent Office 3,702,306
Patented Nov. 7, 1972

3,702,306
FOGGING METHOD AND APPARATUS
David W. Waldron, Valdosta, Ga., assignor to Lowndes Engineering Co., Inc., Valdosta, Ga.
Original application Mar. 17, 1970, Ser. No. 20,364. Divided and this application Oct. 29, 1971, Ser. No. 193,840
Int. Cl. C09k 3/30
U.S. Cl. 252—305                                    7 Claims

ABSTRACT OF THE DISCLOSURE

A fogging method and apparatus including a prime mover driving a blower for supplying air under pressure to a nozzle assembly. The nozzle assembly discharges the air therethrough along a plurality of circumferentially spaced spiral paths and along a centrally located axial path. Minute quantities of liquid such as concentrated pesticide are introduced into the axially directed discharging air and combined with the spirally directed discharging air to produce a fog.

---

This is a division, of application Ser. No. 20,364, filed on Mar. 17, 1970, now U.S. Pat. No. 3,633,825.

BACKGROUND OF THE INVENTION

In the past, insecticides, pesticides, defoliants, fungicides and other chemicals have been spred over a large outdoor area by being dispersed in a liquid carrier, such as diesel oil, and entrained in a stream of hot air. This liquid mixture, which has only about five to six percent active ingredient, is usually transported for application in a large tank holding 350 to 400 gallons operated in conjunction with a fogging machine.

These prior art fogging machines usually consist of a burner which generates a blast of hot air, a nozzle arrangement for mixing the liquid from the tank and directing this aerosol outwardly. Since the liquid mixture of diesel oil and active ingredient formed relatively large droplets in the thus produced fog which caused rapid settling of the droplets, high operating pressures and high discharge velocities were required if the fog was to carry for any appreciable distance. Moreover, the relatively large droplets caused spotting of protective coatings on various objects and burning of foliage on plants.

Due to the bulk of the liquid mixture and the large quantities of fuel needed to superheat the air, large and expensive special equipment was needed to carry the fogging machines. Except for serving as a carrier to disperse the active ingredient, there appears to be little, if any, need for the diesel oil so that it is essentially wasted and only contributes to pollution as well as spotting of protective coatings and burning of foliage.

Also, recent test results have shown that the droplet size in a fog containing an active ingredient liquid changes the effective killing power of the active ingredient on insects. It has been found that the optimum droplet size is 5 to 20 microns mass median diameter, much smaller than that achieved with prior art fogging machines.

SUMMARY OF THE INVENTION

The present invention obviates the difficulties described above by providing a relatively small compact fogging apparatus which will dispense, in finely divided form, ultra small quantities of the concentrated active ingredient liquids or fluids without the necessity of dissolving this ingredient in a liquid carrier. Thus, no large tank is necessary in the apparatus of the present invention and the expense, the undesirable bulkiness and pollution effects of the diesel oil are eliminated, while, at the same time, the power necessary to dispense a prescribed quantity of active ingredient is greatly reduced. Furthermore, the effectiveness and evenness of distribution of insecticides, pesticides, fungicides and the like appears to be improved using the present invention thereby requiring less active ingredient, and the cost of applying an effective amount of a given material to a prescribed area has been materially reduced, i.e., reduced to about one-third the cost of applying the same material with conventional methods and apparatus.

The apparatus of the present invention includes a prime mover which drives an impeller or blower connected to a plenum chamber. A nozzle assembly is connected to the plenum chamber, the nozzle assembly having a central discharge nozzle through which a small portion of the air supplied from the plenum chamber and the active ingredient concentrated liquid are discharged; and a plurality of arcuate inwardly directed, radially spaced, passageways through which a major portion of the air supplied from the plenum chamber is directed toward the discharge end of the nozzle for entraining the emerging liquid and air admixture to produce a fog diverging outward from the nozzle assembly.

Only a single valve controls the flow rate of the liquid from a storage tank through a flow meter to the nozzle. In one embodiment the liquid is slightly pre-heated to control viscosity variations by passing it through a heat excharger in the plenum chamber where the heat of compression is sufficient to heat the air.

Accordingly, it is an object of the present invention to provide a fogging apparatus which is inexpensive to manufacture, durable in structure, and efficient in operation.

Another object of the present invention is to provide a fogging apparatus which is capable of delivering, in finely divided form, minute quantities of active ingredient concentrated liquid over a large area.

Still another object of the present invention is to provide a fogging apparatus which is compact, lightweight and so that it will removably fit into a station wagon or the back of a truck.

A further object of the present invention is to provide an inexpensive nozzle assembly for a fogging apparatus which will throughly and evenly admix and entrain a small amount of liquid in a stream of air and direct the same away from the apparatus.

Another object of the present invention is to produce a fog having sufficiently small droplet size to produce optimum insect killing effectiveness and to produce long range carrying capabilities.

Still another object of the present invention is to provide a method and apparatus which eliminates the necessity of mixing a pesticide, insecticide, fungicide, defoliant, or the like, in a liquid carrier in order to disperse or spray the material over a wide area.

Another object of the present invention is to provide a method and apparatus for dispensing a pesticide, insecticide, fungicide, defoliant, or the like, without the necessity of subjecting the same to high heat.

Other objects, features, and advantages of the present invention will become apparent from the following description when taken in conjunction with the accompanying drawings.

BRIEF DESCRIPTION OF THE DRAWINGS

FIG. 4 is an enlarged, fragmentary, front elevational view of the nozzle assembly of the machines shown in FIGS. 1, 2, and 3;

DETAILED DESCRIPTION OF THE INVENTION

Figure 1:
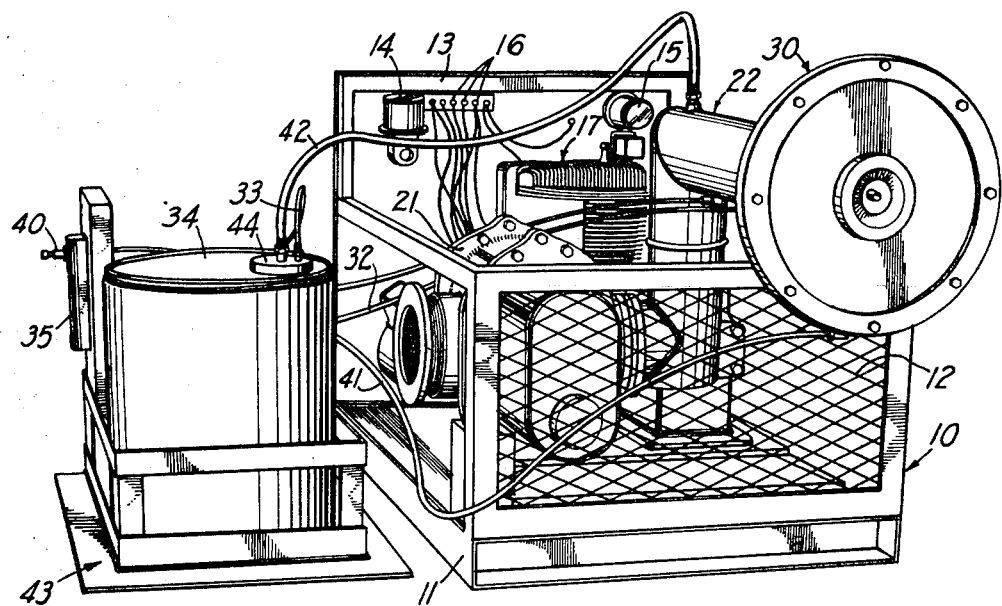
FIG. 1 is a perspective view of one form of a fogging machine constructed in accordance with the present invention.

Referring to the embodiments chosen for the purpose of illustrating the present invention, numeral 10 in FIG. 1 denotes a box-like open frame in which the device of the present invention is mounted. The frame 10 carries a flat base or platform 11, an expanded metal back grill 12 and a front control panel 13. Those conventional controls and gauges 14 and 15 and wires 16 necessary to the operation of gasoline engine 17 are carried on the panel 13, while the engine 17 is mounted on base 11.

It will be understood that, while in the present embodiments, the panel 13 is disposed with the fogging apparatus, control panel 13 could be mounted at a remote position, such as in the cab of a truck so that the operation of the fogging apparatus could be controlled remotely. It will further be understood that the engine 17 may be other types of prime movers.

Figure 2:
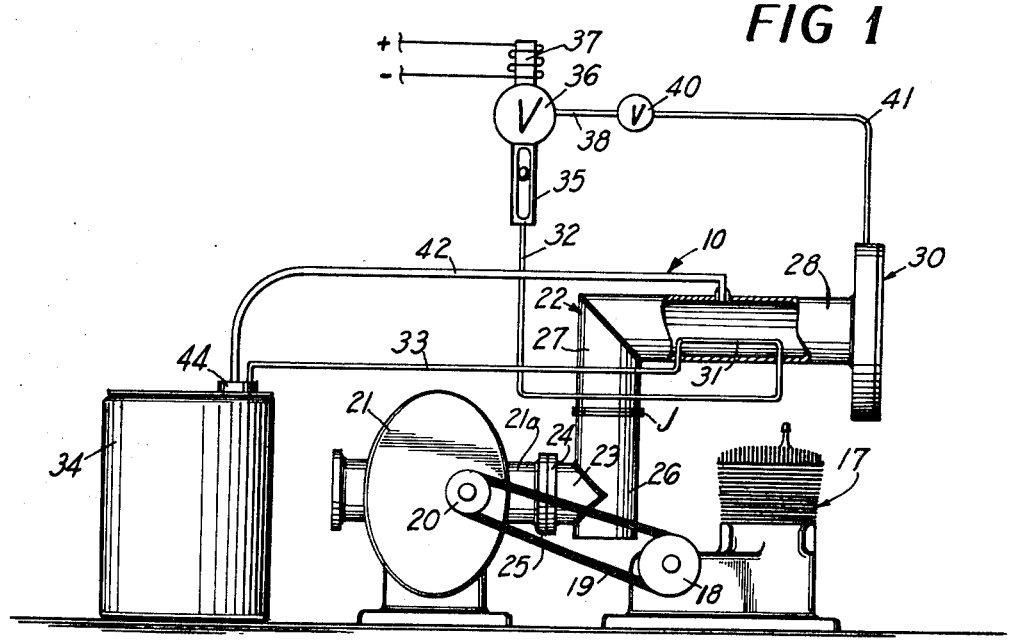
FIG. 2 is a schematic side elevational view, partially broken away, of certain of the elements of the fogging machine disclosed in FIG. 1.

As best seen in FIG. 2, the engine 17 is provided with a pulley 18 which drives, through endless belt 19, a pulley 20. In this embodiment, pulley 20 drives a positive displacement air impeller or blower, such as blower 21, mounted on platform 11 adjacent engine 17.

Carried by blower 21 is L-shaped, upstanding, air plenum chamber denoted generally by numeral 22. Chamber 22 includes a lower horizontal duct 23 which is provided with a vertical butt flange 24 secured to a butt flange 25 on the outlet duct 21a of blower 21. The outer end of duct 23 communicates and provides the sole support for an upstanding duct 26. Rotatably mounted on the upper end of duct 26 and joined in concentric fashion thereto throughto through a conventional rotary joint J is a rotary duct 27 which carries a sidewise or horizontally extending upper duct 28, provided at its outer end with an annular butt flange 29, seen in FIG. 5. By rotation of duct 27 about its vertical axis, the duct 28 can be pointed in any direction.

Extending across and closing the end of the duct 28 is the nozzle assembly, denoted generally by numeral 30. The nozzle assembly 30 will be described in detail hereinafter.

As seen in FIG. 2, a metal heat exchanger tube 31 is disposed within the central portion of the horizontal duct 28. This heat exchanger tube 31 is spaced inwardly of the side wall of the duct and is aligned with the axis of duct 28. The ends of tube 31 are bent downwardly and pass, parallel to each other, outwardly through appropriate holes in duct 28.

Flexible tubing or hoses 32 and 33 are fitted to the free ends of tube 31, the hose 33 leading from a tank 34 and the hose 32 leading to the bottom of a flow meter 35.

On the top of the flow meter 35 is an on-off valve 36, with its control solenoid 37. One side of valve 36 is connected to flow meter 35 and the other side to a discharge tube 38 leading to a control valve 40. From the control valve 40 a tube 41 leads to the nozzle assembly 30.

Figure 6:
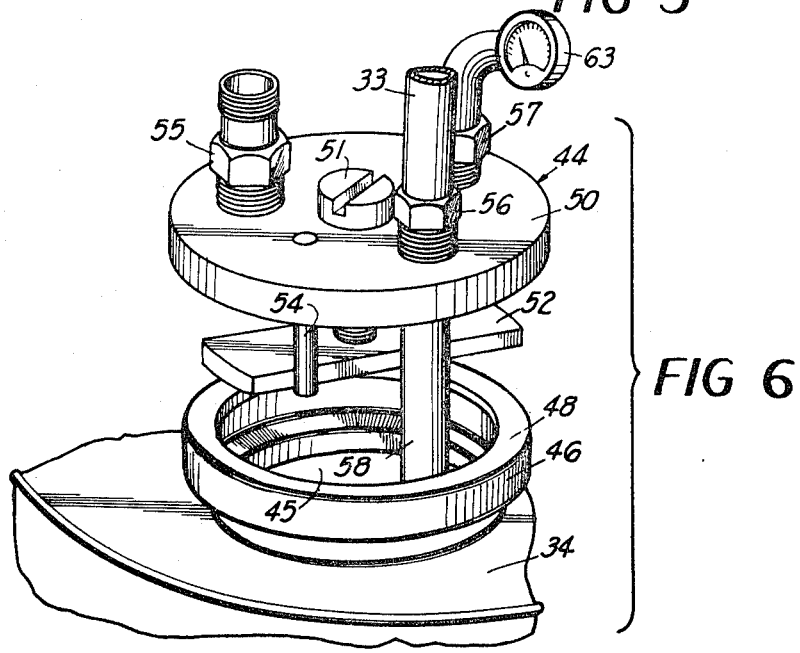

A pressure hose 42 leads from the duct 28 to the tank 34 through a cap assembly 44 shown in detail in FIG. 6. The hose 42 communicates with the interior of the duct 28 and the interior of tank 34.

Referring to FIG. 2, the engine 17 rotates the blower 21 appropriately to cause a pressure to be generated inside of duct 28. Those hose 42 then supplies pressure to the interior of the tank 34 above the fluid contained therein thereby causing the active ingredient fluid to be forced out of the tank 34 through the hose 33 and through the heat exchanger tube 31 whereupon the fluid such as pesticide is heated to a substantially constant temperature and then supplies same via hose 32 through the flow meter 35 and valve 40 to the nozzle assembly 30. Since the viscosity of most active ingredient fluids such as malathion, fenthion, or naled varies considerably with temperatures less than about 110 to 120° F. but does not appreciably vary above these temperatures, heating the fluid in the tube 31 above this temperature serves to provide constant metering of fluid through flow meter 35 and control valve 40. The fluid will be heated to this temperature range by the air in duct 28 which has been inherently heated during compression in blower 21. This eliminates the need for a burner to heat the fluid and air that was previously required. While it is desirable, due to the slightly heated condition of the liquid fed from the heat exchanger tube 31 to nozzle assembly 30, to have tubes 32, 28, and 41 as short as possible, nevertheless, the flow meter 35 and the flow control needle valve 40 could be mounted in a remote position, such as on the dash panel of a truck. Also, if desired, tubes 32, 38, and 41 can be wrapped with insulation.

In the present embodiment, the flow meter 35 and the control valve 40 are mounted in juxtaposition on the base 43 supporting the tank 34 so that the flow meter may be observed as valve 40 is adjusted for delivery of a prescribed amount. By varying the opening of needle control valve 40, the amount of fluid delivered to nozzle assembly 30 can be varied.

The container or tank 34 is preferably a conventional five gallon drum, such as the drums in which many types of insecticides, such as malathion, fenthion or naled, are shipped. These drums normally have an opening 45 therein as best seen in FIG. 6 with an upstanding collar 46 thereabout. The collar 46 has an inwardly extending retaining flange 48 therearound to receive the standard closure cap (not shown) thereon. The cap assembly 44 is shown ready for placement into collar 46 in FIG. 6.

The cap assembly 44 includes a disc shaped cover member 50 adapted to fit over the top of flange 46 with a conventional gasket (not shown) carried thereunder for engagement with the top of flange 46 to seal the opening 45 in tank 34. The assembly 44 is provided with a centrally disposed screw 51 which is freely rotatable within cover member 50 and threadedly engages a locking plate 52 under member 50. An anti-rotation pin 54 depends from cover member 50 to strike the edge of the locking plate 52 to limit the rotation thereof. Therefore, it will be seen that since the length of locking member 52 is properly dimensioned and that when the screw 51 is loosened so as to space locking plate 52 below the cover member 50, the assembly 44 can be positioned on top of the upstanding collar 46 by tilting assembly 44 and inserting the locking member 52 under the retaining flange 48 about the upstanding collar 46. The screw 51 is then tightened so as to cause the locking plate 52 to engage the underside of the flange 48 and lock the cover member 50 over the top of the upstanding collar 46 to seal the top of the tank 34. The hose 42 supplying pressure to the interior of the tank 34 is connected to cover member 50 through a fitting 55 having a passage therethrough which communicates with the interior of the tank 34 when the assembly 44 is in position. The hose 33 communicates with the interior of the tank 34 through a fitting 56 carried by member 50 and having a passage therethrough which communicates the interior of the tank 34. In order that all of the fluid contained in the tank 34 will be dispersed through hose 33, a depending pickup tube 58 is attached to the bottom of the fitting 56 and extends below cover member 50 to a position closely adjacent to the bottom of the tank 34.

It will also be noted in FIG. 6 that an additional fitting 57 is provided through cover member 50 for connection to a pressure gage 63. The gage 63 indicates when the desired operating pressure has been achieved in tank 34 and when the pressure in tank 34 is leaking past assembly 44.

Figure 3:
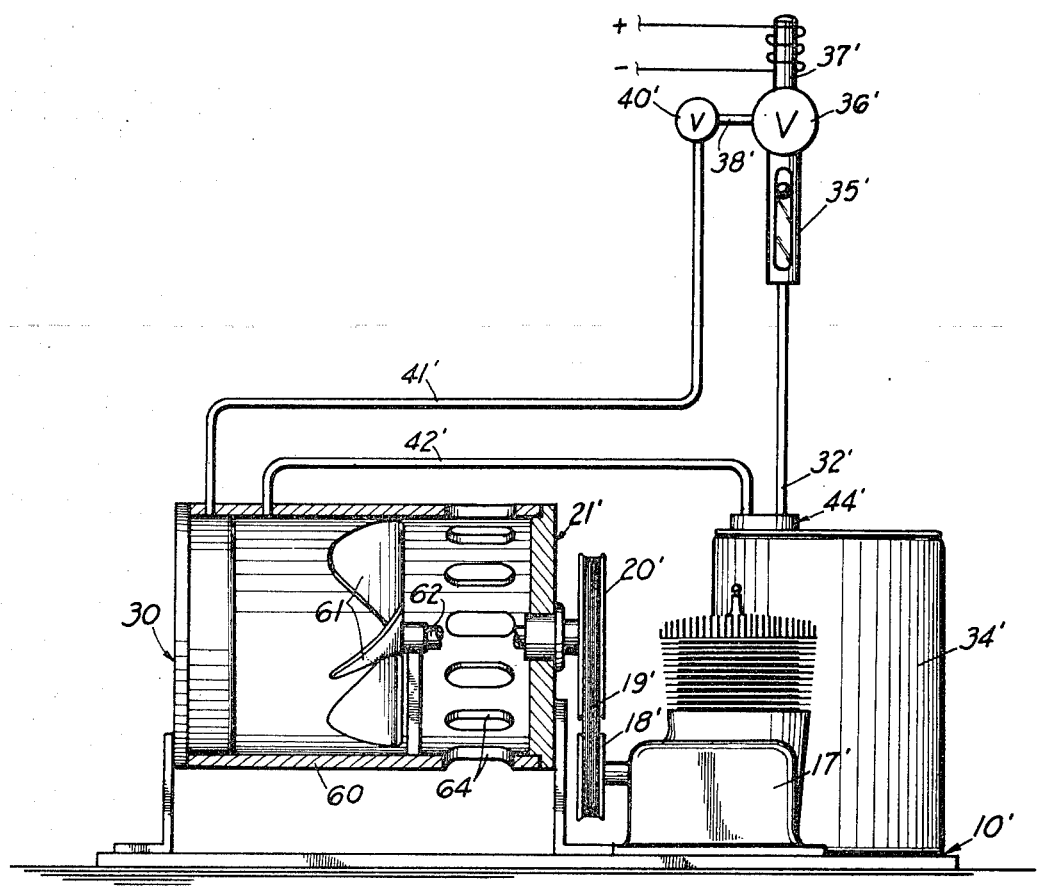
FIG. 3 is a schematic, side elevational view, partially broken away, and depicting a modified form of the fogging machine of the present invention.

Referring to FIG. 3 it will be seen that another embodiment of the invention is shown. This embodiment of the invention, uses the same nozzle assembly 30 hereinafter described. The second embodiment of the invention includes a support platform 10' which carries thereon an engine 17' similar in construction to the engine disclosed in the first embodiment of the invention. The engine 17' is provided with an output driving pulley 18' and an endless belt 19' connected to the input driving pulley 20' of a blower 21'.

The blower 21' includes a cylindrical housing 60 provided with an impeller or fan 61 appropriately mounted for rotation about an axis coinciding with the axis of the housing 60. The fan 61 is connected to the pulley 20' through a drive shaft 62 rotatably carried by housing 60. The fan 61 is arranged to generate a pressure to the left thereof as seen in FIG. 3 through the nozzle assembly 30 and the housing 60 is provided with a plurality of circumferentially spaced ports 64 therethrough on the low pressure intake side of the fan 61 so that when the engine 17' drives the fan 61, air will be drawn in through ports 64 compressed by fan 61, and driven through the nozzle assembly 30. Pressure is supplied to the interior of a fluid tank 34' similar to fluid tank 34 through a pressure pipe 42' communicating with the pressurized interior of housing 60 and with the interior of tank 34 through a cap assembly 44' similar in construction to cap assembly 44. Liquid supply hose 32' places a flow meter 35' in communication with the interior of tank 34' to supply liquid from tank through flow meter 35' in a manner similar to that disclosed for the first embodiment of the invention. The liquid passing through flow meter 35' is supplied to nozzle assembly 30 by passing through a solenoid cut-off valve 36' with its solenoid 37', through pipe 38', through flow control valve 40', and pipe 41' in a manner similar to that hereinabove disclosed for the first embodiment of the invention. It will be seen that no provision is made for heating the fluid received from the tank 34' before it reaches flow meter 35', however, it is to be understood that such an arrangement could be made similar to that disclosed for the first embodiment of the invention.

Figure 5:
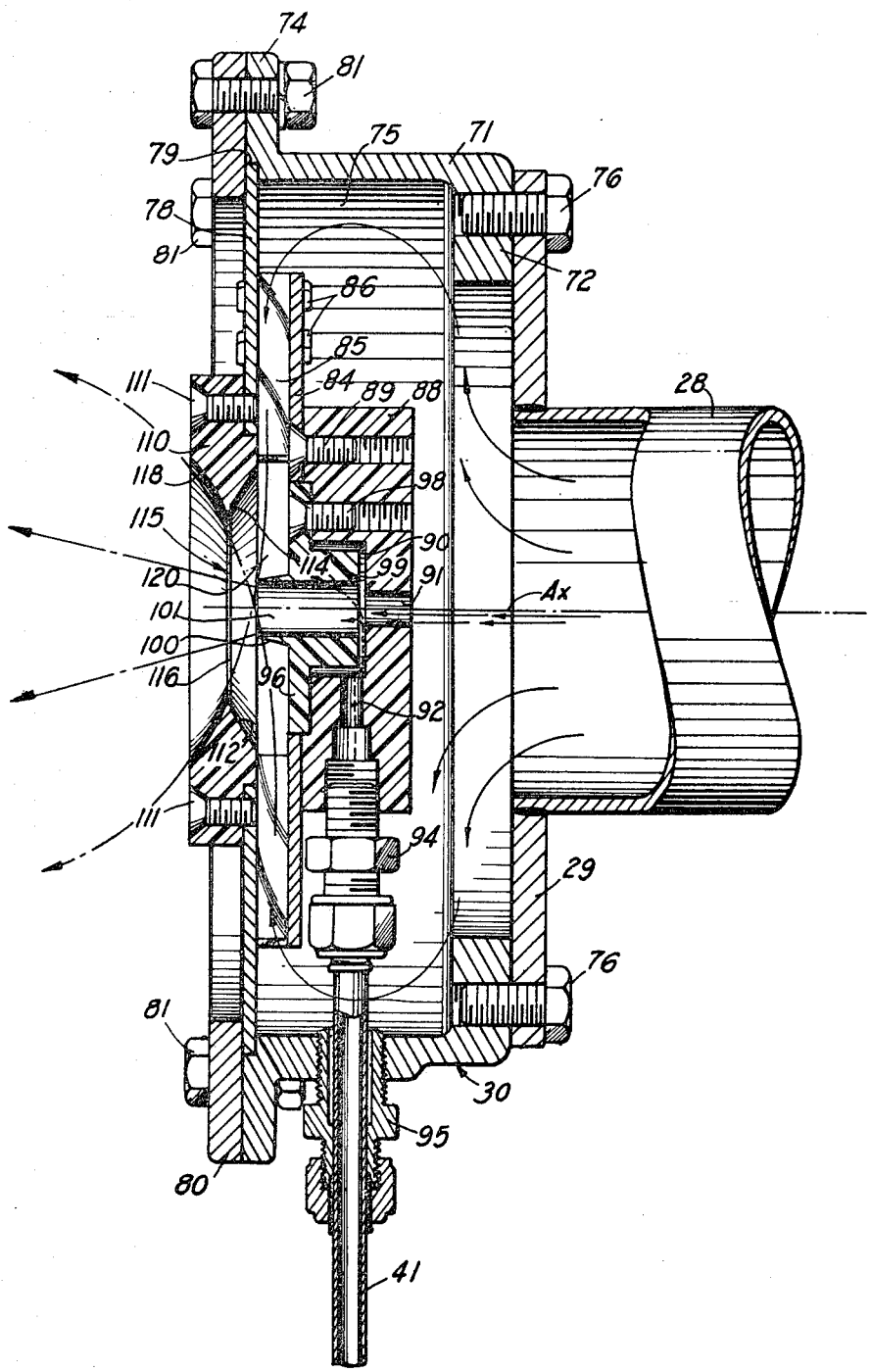
FIG. 5 is a cross-sectional view, taken substantially along line 5—5 in FIG. 4; and, FIG. 6 is a perspective view of the cap assembly for the active ingredient tank of the machine shown in FIG. 1.

Referring more specifically to FIGS. 4 and 5, it will be seen that the nozzle assembly 30 includes an annular housing 71 having an inwardly directed amounting flange 72 at the right or inlet end as seen in FIG. 5 and an outwardly directed positioning flange 74 at the discharge or left end thereof as seen in FIG. 5. The housing 71 defines an air receiving chamber 75 therein closed at the inlet end thereof by mounting flange 29 connected to the mounting flange 72 through appropriate bolts 76 and partially closed at the discharge end thereof by an annular positioning plate 78. The positioning plate 78 is received in an appropriately formed recess 79 in the forward edge of housing 71 and is retained in position by a retaining ring 80 connected to the positioning flange 74 of housing 71 by nut and bolt assemblies 81. The positioning plate 78 is washer-shaped providing a central aperture therethrough.

A secondary positioning plate 84 which is also washer shaped but having a smaller outside and inside diameter is positioned behind the plate 78 toward the inlet side of the housing 71 by a plurality of arcuate shaped vanes 85 which are arranged along a spiral path relative to the axis AX of nozzle assembly 30. The vanes 85 are connected to plates 78 and 84 through locking tabs 86. The inside passage through secondary positioning plate 84 is closed by a mounting block 88 connected to plate 84 through screws 89 and extending from plate 84 into the chamber 75 toward the inlet end of housing 71.

Block 88 is made of plastic or some other non-corrosive material and defines a centrally located fluid recess 90 therein extending into block 88 from the discharge side of housing 71. A centrally located, axially extending passage 91 is also defined through block 88. Passage 91 is centrally located with respect to recess 90 and communicates with chamber 75 at one end thereof and with recess 90 at the other end thereof. Hose 41 supplying fluid to the nozzle assembly 30 communicates with the recess 90 in the block 88 through a radially extending port 92 communicating with the recess 90 and with the hose 41 through appropriate fitting 94 connected to block 88 and fitting 95 connected through housing 71. Therefore, it will be seen that fluid supplied through the hose 41 will be supplied to the recess 90. It will also be seen that part of the air supplied into chamber 75 through duct 28 will be supplied through passage 91 to the recess 90.

A nozzle plate 96 having an outside diameter coinciding with the inside diameter of the plate 84 and received in positioning recess in the face of the block 88 adjacent to the discharge side of the housing 71 partially closes the recess 90 in block 88. The nozzle plate 96 is maintained in position on the block 88 by a plurality of screws 98. The nozzle plate 96 defines an outstanding collar 99 extending from one side of the plate 96 toward the inlet side of housing 71 to a position spaced from the bottom of recess 90 and having an outside diameter slightly less than that of the recess 90. The collar 99 is integral with the plate 96 and is concentrically located with respect to the recess 90 when the plate 96 is in position. The outside of the plate 96 adjacent to discharge side of housing 71 includes a tapered nozzle flange 100 which extends from the plate 96 toward the discharge side of housing 71 and is concentrically located about axis AX. A nozzle passage 101 is defined through the plate 96, collar 99, and nozzle flange 100. This nozzle passage 101 is concentrically located with respect to the axis AX and is larger in diameter than the passage 91 through the block 88. A deflection member 110 is carried on the discharge side of plate 78 and reduces the effective diameter of the central aperture therethrough. The deflection member 110 is maintained in position by screws 111 engaging plate 78 and positions the member 110 so that the inside surface thereof is in alignment with the forward surfaces of vanes 85 extending toward the discharge side of housing 71. Member 110 defines an inwardly tapering annular surface 112 concentric about axis AX. Surface 112 begins just inwardly of the inner ends of vanes 85 and extends toward the discharge side of nozzle assembly 30 to terminate in an annular surface 114 concentric with axis AX. Surface 114 terminates in an annular knife edge 116 defining a passage 115 aligned with axis AX and appreciably larger than passage 101 and spaced forwardly thereof. While the exact dimensions and proportions of the same may vary with different fluids and conditions, it has been found that a passage 101 that is $7/16$ inch in diameter with passage 115 being $1\frac{3}{8}$ inches in diameter and spaced from flange 100 by $3/16$ inch produces a satisfactory operation. An outwardly flaring concave annular surface 118 extends from edge 116 to the discharge side of member 110 and is concentric with axis AX.

As air under pressure is supplied through duct 28 as indicated by the solid line arrows in FIG. 5, it enters chamber 75 in housing 71 of the nozzle assembly 30. While air may be supplied under different pressures to assembly 30, it has been found that a pressure range of 2 to 5 p.s.i. is adequate. A certain percentage of this air is forced through passages 91 and 101 along an axial path along axis AX. The remainder of the air, a larger percentage than that passing along the axis path, is forced outwardly as indicated in chamber 75 and then inwardly through the passages defined between vanes 85 along a plurality of circumferentially spaced spiral paths (see FIG. 4) perpendicular to axis AX. While conditions may require the percentages of the total air from duct 28 passing along the axial and spiral paths to be varied, one embodiment of the invention wherein approximately 99% of the air, passes along the spiral paths as the primary stream and 1% of the air passes along the axial path as the secondary stream has been found adequate.

The desired amount of active ingredient fluid from tank 34 is metered into recess 90 and passage 101 as indicated by the dashed line arrows in FIG. 5 through port 92. As the fluid enters passage 101, it is picked up by the axially flowing air stream and moved along passage 101 therewith. This is indicated by dot-dash line arrows in FIG. 5. As the secondary stream of air passes from passage 91 to nozzle passage 101, it expands thereby insuring that the active ingredient fluid will be picked up by the secondary air stream. The fluid then forms an ultra thin film around the passage 101 as it moves along said passage.

At the same time, the spiraling air streams expand as they reach the surface 112 and are then directed inwardly across the discharge end of nozzle flange 100 by surface 114. As these spiralling air streams strike the outside tapering surface of nozzle flange 100 and also the opposing spiralling air stream, an axially directed component of movement is imparted thereto. As the spiralling primary air streams shear the fluid film into droplets, these droplets of fluid are entrained therein as the air streams pass over the surface 118 to form an outwardly diverging fog. The axial air stream and surface 118 impart a further axially directed component of movement to the outwardly spiralling mixture of atomized fluid and air. This arrangement provides adequate dispersion for very low fluid flow rates of less than 0.7 fluid ounces/min. to more than 5.7 fluid ounces/min. with excellent carrying distances of 600 feet under low wind conditions (2.5 m.p.h.) to over 1 mile under high wind conditions (6–8 m.p.h.) when the axis AX of the nozzle assembly 30 is parallel to the ground.

When using the invention disclosed herein, the droplet size formed in the fog is very close to the optimum 5 to 20 micron mass medium diameter size suggested in recent publications for pesticide or insecticide dispersion. Due to the high dispersion of the fluid used in the invention disclosed herein, the quantity of insecticide needed to adequately kill mosquitoes and other insects is reduced approximately one-half while the speed of the vehicle carrying the dispersing unit can be increased from 3 to 5 times that normally associated with prior art dispersing units. Also, since the active ingredient fluid is used in its concentrated form, usually 95%, the need for a large tank to contain the prior art mixture is eliminated thereby reducing the entire dispensing mechanism to a size which can be easily and manually loaded into the back of a truck or other vehicle for use during the spraying operation and subsequently removed therefrom once this operation is over to allow the vehicle to be put to other use. This results in reducing the initial investment cost to approximately ⅓ that normally associated with prior art spraying units.

METHOD

From the foregoing, the method of the invention should be apparent. The method includes passing a secondary stream of compressed air along a confined substantially straight axial path toward the atmosphere, introducing an active ingredient fluid or liquid into the secondary air stream and directing a plurality of primary streams of compressed air spirally inwardly toward and at least partially through said secondary air stream after said fluid has been introduced therein and then spirally outward to impart an outwardly swirling motion to said liquid while dividing the liquid into finely divided droplets. The active ingredient fluid or liquid forms an ultra-thin film around the secondary air stream and this film is substantially sheared into droplets having a mass medium diameter of 5 to 20 microns by the primary air stream to be dispensed as a fog.

The active ingredient fluid or liquid may be heated to the temperature range where the viscosity of the fluid is substantially constant so that accurate metering can take place.

The secondary air stream may also be expanded slightly as the fluid is injected therein to better produce the ultra-thin film. Also, it is to be understood that the ultra-thin film of fluid may be created by means other than the secondary air stream in order for the primary air stream to shear and dispense the same.

The low temperatures involved with the invention herein has caused the invention to become known as an ultra-low volume (ULV) cold aerosol nozzle.

While specific embodiments of the invention have been disclosed herein, it is to be understood that full use of modifications, substitutions and equivalents may be made without departing from the scope of the invention.

I claim:

1. A method of dispensing minute quantities of fluid in a primary air stream to form a fog having finely divided droplets of the fluid therein comprising the steps of:
   (a) moving the primary air stream in at least one first inwardly and then outwardly flaring spiral path about a straight axis and into the atmosphere;
   (b) simultaneously moving a secondary air stream along said axis and through said primary air stream into the atmosphere; and,
   (c) injecting the fluid into said secondary air stream at a predetermined rate before it passes through said primary air stream to cause the fog released to the atmosphere to have an outwardly swirling motion.

2. The method of claim 1 wherein said secondary air stream is expanded as the fluid is introduced therein.

3. The method of claim 1 wherein said primary air stream is moved along a plurality of individually converging spiral paths toward said axis and circumferentially spaced about said axis.

4. The method of claim 3 wherein said primary and secondary air streams are under pressure.

5. The method of claim 3 wherein said fluid is heated to its substantially constant viscosity range before introduction into said secondary air stream.

6. A method of dispensing minute quantities of fluid in an air stream to form a fog having finely divided droplets of the fluid therein comprising the steps of:
   (a) moving said air stream in at least one first inwardly and then outwardly flaring spiral path about a straight axis and into the atmosphere; and,
   (b) injecting an ultra thin film of said fluid into said air stream along said axis to cause said air stream to shear said film into finely divided droplets of fluid entrained in said air stream for dispensing same.

7. The method of claim 6 wherein the mass median diameter of said droplets of fluid are predominately in the range of 5 to 20 microns.

References Cited
UNITED STATES PATENTS
3,633,825    1/1972    Waldron _____ 239—135

JOHN D. WELSH, Primary Examiner

U.S. Cl. X.R.

252—359